United States Patent
Perkins et al.

(10) Patent No.: US 10,684,388 B2
(45) Date of Patent: Jun. 16, 2020

(54) DISCRIMINATION ANALYSIS USED WITH OPTICAL COMPUTING DEVICES

(71) Applicant: Halliburton Energy Services, Inc., Houston, TX (US)

(72) Inventors: David L. Perkins, The Woodlands, TX (US); Dingding Chen, Tomball, TX (US); Christopher Michael Jones, Houston, TX (US); Jing Shen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 522 days.

(21) Appl. No.: 14/360,214

(22) PCT Filed: Jun. 7, 2013

(86) PCT No.: PCT/US2013/044651
§ 371 (c)(1),
(2) Date: May 22, 2014

(87) PCT Pub. No.: WO2014/196979
PCT Pub. Date: Dec. 11, 2014

(65) Prior Publication Data
US 2015/0205000 A1 Jul. 23, 2015

(51) Int. Cl.
*G01V 8/10* (2006.01)
*G01N 21/31* (2006.01)

(52) U.S. Cl.
CPC .............. *G01V 8/10* (2013.01); *G01N 21/31* (2013.01); *G01N 2201/1296* (2013.01)

(58) Field of Classification Search
CPC ........... G01N 21/31; G01N 2201/1296; G01N 21/27; G01V 8/10; E21B 49/08
See application file for complete search history.

(56) References Cited

U.S. PATENT DOCUMENTS 5,435,309 A * 7/1995 Thomas ............. A61B 5/14532
250/339.12
6,198,531 B1 3/2001 Myrick et al.
(Continued)

FOREIGN PATENT DOCUMENTS

EP 2071329 A2 6/2009
WO 2014196979 A1 12/2014

OTHER PUBLICATIONS

Janda's Home Page—Advantages of Discriminant Analysis, Nov. 14, 2004, janda.org, p. 1.*
(Continued)

*Primary Examiner* — Sujoy K Kundu
*Assistant Examiner* — L. Anderson
(74) *Attorney, Agent, or Firm* — Gilliam IP PLLC

(57) ABSTRACT

Disclosed are systems and methods that use discriminant analysis techniques and processing in order to reduce the time required to determine chemical and/or physical properties of a substance. One method includes optically interacting a plurality of optical elements with one or more known substances, each optical element being configured to detect a particular characteristic of the one or more known substances, generating an optical response from each optical element corresponding to each known substance, wherein each known substance corresponds to a known spectrum stored in an optical database, and training a neural network to provide a discriminant analysis classification model for an unknown substance, the neural network using each optical response as inputs and one or more fluid types as outputs, and the outputs corresponding to the one or more known substances.

21 Claims, 9 Drawing Sheets

(56) References Cited

U.S. PATENT DOCUMENTS

| | | | |
|---|---|---|---|
| 6,529,276 | B1 | 3/2003 | Myrick |
| 6,789,620 | B2 | 9/2004 | Schultz et al. |
| 6,853,925 | B2 | 2/2005 | Daniel et al. |
| 7,620,212 | B1 | 11/2009 | Allen et al. |
| 7,920,258 | B2 | 4/2011 | Myrick et al. |
| 8,237,920 | B2 | 8/2012 | Jones et al. |
| 2006/0249680 | A1 | 11/2006 | Hu et al. |
| 2008/0133193 | A1 | 6/2008 | Gdanski et al. |
| 2009/0078860 | A1 | 3/2009 | Kischkat et al. |
| 2009/0268203 | A1* | 10/2009 | Uzunbajakava .......... G01J 3/02 356/436 |
| 2009/0299946 | A1 | 12/2009 | Myrick et al. |
| 2010/0299078 | A1 | 11/2010 | Guieze |
| 2011/0026029 | A1 | 2/2011 | Iwasaki et al. |
| 2013/0284901 | A1* | 10/2013 | Freese .................... G01N 21/17 250/208.2 |
| 2014/0309959 | A1* | 10/2014 | Shen .................... G01N 33/241 702/100 |
| 2015/0094219 | A1* | 4/2015 | Trowell .................... C12Q 1/66 506/9 |

OTHER PUBLICATIONS

International Search Report and Written Opinion for PCT/US2013/044651 dated Mar. 6, 2014.
Office Action received in corresponding Canadian Application No. 2,908,923 dated Oct. 7, 2016.
Mexican Application Serial No. MX/a/2015/013987; Office Action; dated Nov. 8, 2018, 5 pages.
Mexico Application Serial No. MX/a/2015/013987, Office Action 2, dated Feb. 28, 2019, 5 pages.

\* cited by examiner

DISCRIMINATION ANALYSIS USED WITH OPTICAL COMPUTING DEVICES

This application is a National Stage entry of and claims priority to International Application No. PCT/US2013/044651, filed on Jun. 7, 2013.

BACKGROUND

The present invention relates to optical computing devices and, more particularly, to using discriminant analysis techniques and processing with optical computing devices in order to reduce the time required for determination of chemical and/or physical properties of a substance.

In the oil and gas industry, it can be important to determine precisely the characteristics and chemical compositions of fluids circulating into and out of subterranean hydrocarbon-bearing formations. Typically, the analysis of fluids related to the oil and gas industry is conducted off-line using laboratory analyses, such as spectroscopic and/or wet chemical methods, which analyze an extracted sample of the fluid. Depending on the analysis required, however, such an approach can take hours to days to complete, and even in the best-case scenarios, a job will often be completed prior to completion of the analysis.

Off-line, retrospective analyses can further be unsatisfactory for accurate determination of fluid characteristics, because the characteristics of an extracted sample of the fluid often change during the lag time between collection and analysis, thereby rendering the measured properties of the sample non-indicative of the true chemical composition or characteristic. Factors that can alter the characteristics of a fluid during the lag time between collection and analysis can include, for example, scaling, reaction of various components in the fluid with one another, reaction of various components in the fluid with components of the surrounding environment, simple chemical degradation, and bacterial growth.

Furthermore, accurate off-line laboratory analyses of a fluid sample can sometimes be difficult to perform because of unknown contaminants. For example, the collection of the sample in the field is typically obtained using a probe-type tool. However, it is difficult to know with certainty that the sample obtained is virgin formation fluid, rather than formation fluid contaminated with drilling fluid. While analyses of a fluid sample consisting solely of formation fluid may be accurate, a contaminated fluid sample is more likely to render inaccurate data. Although off-line retrospective analyses of a fluid can be satisfactory in certain cases, there are several drawbacks to such methods where a real-time or near real-time analysis would otherwise be a more effective method.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
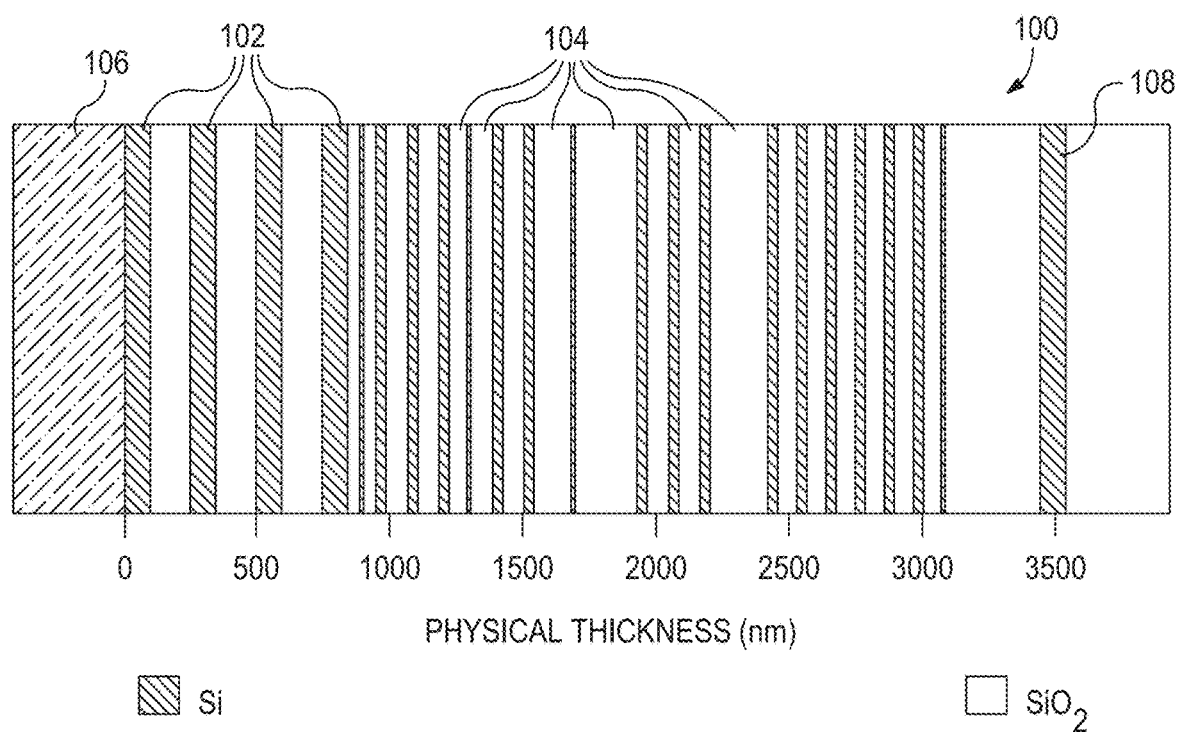
FIG. 1 illustrates an exemplary integrated computation element, according to one or more embodiments.

The present invention relates to optical computing devices and, more particularly, to using discriminant analysis techniques and processing with optical computing devices in order to reduce the time required for determination of chemical and/or physical properties of a substance.

The present disclosure discusses the use of optical computing devices, also referred to as "opticoanalytical devices," for the real-time or near real-time monitoring of a substance, or a sample of a substance. Exemplary optical computing devices receive an input of electromagnetic radiation associated with a substance and produce an output of electromagnetic radiation from an optical element arranged within the optical computing device. The optical element may be, for example, an integrated computational element (ICE), also known as a multivariate optical element (MOE). The electromagnetic radiation that optically interacts with the processing element is changed so as to be readable by a detector, such that an output of the detector can be correlated to a particular characteristic of the substance.

Such optical computing devices can advantageously provide real-time or near real-time monitoring that cannot presently be achieved with either onsite analyses at a job site or via more detailed analyses that take place in a laboratory. A significant and distinct advantage of these devices is that they can be configured to specifically detect and/or measure a characteristic of interest of a substance, such as chemical and/or physical properties of the substance, thereby allowing qualitative and/or quantitative analyses of the substance to occur without having to extract a sample and undertake time-consuming analyses of the sample at an off-site laboratory.

As used herein, the term "characteristic" refers to a chemical, mechanical, or physical property of a substance, such as a quantitative or qualitative value of one or more chemical constituents or compounds present therein or any physical property associated therewith. Illustrative characteristics that can be monitored with such optical computing devices can include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "optical computing device" refers to an optical device that is configured to receive an input of electromagnetic radiation associated with a substance, such as a fluid and produce an output of electromagnetic radiation from a processing element arranged within the optical computing device. The processing element may be, for example, an integrated computational element (ICE) used in the optical computing device. The electromagnetic radiation that optically interacts with the processing element is changed so as to be readable by a detector, such that an output of the detector can be correlated to a characteristic of the fluid or a phase of the fluid. The output of electromagnetic radiation from the processing element can be reflected electromagnetic radiation, transmitted electromagnetic radiation, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid or a phase thereof, for example via fluorescence, luminescence, Raman, Mie, and/or Raleigh scattering, can also be monitored by the optical computing devices.

As used herein, the term "optically interact" or variations thereof refers to the reflection, transmission, scattering, diffraction, or absorption of electromagnetic radiation either on, through, or from one or more processing elements (i.e., integrated computational elements) or a substance. Accordingly, optically interacted light refers to electromagnetic radiation that has been reflected, transmitted, scattered, diffracted, or absorbed by, emitted, or re-radiated, for example, using an integrated computational element, but may also apply to interaction with a substance, such as a fluid.

As used herein, the term "fluid" refers to any substance that is capable of flowing, including particulate solids, liquids, gases, slurries, emulsions, powders, muds, glasses, mixtures, combinations thereof, and the like. The fluid may be a single phase or a multiphase fluid. In some embodiments, the fluid can be an aqueous fluid, including water, brines, or the like. In other embodiments, the fluid may be a non-aqueous fluid, including organic compounds, more specifically, hydrocarbons, oil, a refined component of oil, petrochemical products, and the like. In some embodiments, the fluid can be acids, surfactants, biocides, bleaches, corrosion inhibitors, foamers and foaming agents, breakers, scavengers, stabilizers, clarifiers, detergents, a treatment fluid, fracturing fluid, a formation fluid, or any oilfield fluid, chemical, or substance as found in the oil and gas industry and generally known to those skilled in the art. The fluid may also have one or more solids or solid particulate substances entrained therein. For instance, fluids can include various flowable mixtures of solids, liquids and/or gases. Illustrative gases that can be considered fluids according to the present embodiments, include, for example, air, nitrogen, carbon dioxide, argon, helium, methane, ethane, butane, and other hydrocarbon gases, hydrogen sulfide, combinations thereof, and/or the like.

As used herein, the term "substance," or variations thereof, refers to at least a portion of matter or material of interest to be tested or otherwise evaluated using the optical computing devices described herein. The substance includes the characteristic of interest, as defined above, and may be any fluid, as defined herein, or otherwise any solid substance or material such as, but not limited to, rock formations, concrete, solid wellbore surfaces, and solid surfaces of any wellbore tool or projectile (e.g., balls, darts, plugs, etc.).

According to the disclosed embodiments, employing discriminant analysis techniques and processing with optical computing devices using one or more ICE components can further aid in reducing the time required to accurately determine the characteristic (e.g., the chemical and/or physical properties) of a sample substance being analyzed. This determination may be performed in parallel with the collection of optical measurements in situ. While ICE technology generally enables a near real-time, in situ measurement of a sample substance, qualitative uses of discriminant analysis techniques using ICE technology can infer, for example, a particular chemical grouping based on optical spectroscopic data. For example, by using qualitative discriminant analysis, an unknown sample substance may be narrowed and otherwise readily assigned to a particular chemical grouping of known sample substances. As a result, operators may then be enabled to optimize subsequent measurement parameters and/or procedures (e.g., handling and safety precautions) before traditional sampling of the substance is undertaken. Moreover, qualitative discriminant analysis may allow an operator to decide that a particular calibration is more suitable in predicting a specific analytical concentration as opposed to other potential calibration models (e.g., in deciding the difference between light oil and heavy oil).

In addition to qualifying a sample into a particular group, discriminate analysis can further aid in the quantitative analysis of a chemical property of an unknown sample substance. By using quantitative discriminant analysis techniques, a more narrow grouping of calibrations may be employed, thereby increasing the accuracy and efficiency of optical computing device measurements. For example, in the exploration and extraction of hydrocarbons, many different types of oil can be expected to be encountered. To avoid having to undertake multiple lab-based calibrations in which an infinite number of oil samples will be measured against an infinite number of prepared calibrations, a small library of calibrations can be compiled and quantitative discriminant analysis techniques may be applied to such a library to point to, for example, a small number or series of calibrations. As a result, an unknown oil sample may be classified and/or otherwise quantified using ICE technology without the need to employ a large library of calibrations which can be very time-consuming and expensive to develop.

The use of discriminant analysis in conjunction with optical computing devices may provide several advantages. In some applications, for example, using discriminant analysis techniques in conjunction with optical computing devices using ICE components can facilitate increased flexibility in supporting tools in field use by enabling subtle changes to be made in the calibration of the tool without requiring a sample to be extracted and analyzed in the lab.

As mentioned above, the processing element used in the exemplary optical computing devices discussed herein may be an integrated computational element (ICE), referred to herein as an "ICE component". In operation, an ICE component is capable of distinguishing electromagnetic radiation related to a characteristic of interest of a substance (e.g., a fluid or an object present in the fluid) from electromagnetic radiation related to other components of the substance. Referring to FIG. 1, illustrated is an exemplary ICE 100 that may include a plurality of alternating layers 102 and 104, such as silicon (Si) and SiO₂ (quartz), respectively. In general, these layers 102, 104 consist of materials whose index of refraction is high and low, respectively. Other examples of materials might include niobia and niobium, germanium and Germania, $MgF_2$, SiO, and other high and low index materials known in the art. The layers 102, 104 may be strategically deposited on an optical substrate 106. In some embodiments, the optical substrate 106 is BK-7 optical glass. In other embodiments, the optical substrate 106 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite the optical substrate 106 in FIG. 1), the ICE 100 may include a layer 108 that is generally exposed to the environment of the device or installation. The number of layers 102, 104 and the thickness of each layer 102, 104 are determined from the spectral attributes acquired from a spectroscopic analysis of a characteristic of the substance being analyzed using a conventional spectroscopic instrument. It should be understood that the exemplary ICE 100 in FIG. 1 does not in fact represent any particular characteristic of a given substance, but is provided for purposes of illustration only. Consequently, the number of layers 102, 104 and their relative thicknesses, as shown in FIG. 1, bear no correlation to any particular characteristic. Moreover, those skilled in the art will readily recognize that the materials that make up each layer 102, 104 (i.e., Si and $SiO_2$) may vary, depending on the application, cost of materials, and/or applicability of the material to the given substance being analyzed.

In some embodiments, the material of each layer 102, 104 can be doped or two or more materials can be combined in a manner to achieve the desired optical characteristic. In addition to solids, the exemplary ICE 100 may also contain liquids and/or gases, optionally in combination with solids, in order to produce a desired optical characteristic. In the case of gases and liquids, the ICE 100 can contain a corresponding vessel (not shown), which houses the gases or liquids. Exemplary variations of the ICE 100 may also include holographic optical elements, gratings, piezoelectric, light pipe, and/or acousto-optic elements, for example, that can create transmission, reflection, and/or absorptive properties of interest.

The multiple layers 102, 104 exhibit different refractive indices. By properly selecting the materials of the layers 102, 104 and their relative thickness and spacing, the ICE 100 may be configured to selectively pass/reflect/refract predetermined fractions of electromagnetic radiation at different wavelengths. Each wavelength is given a predetermined weighting or loading factor. The thickness and spacing of the layers 102, 104 may be determined using a variety of approximation methods from the spectrum of the characteristic or analyte of interest. These methods may include inverse Fourier transform (IFT) of the optical transmission spectrum and structuring the ICE 100 as the physical representation of the IFT. The approximations convert the IFT into a structure based on known materials with constant refractive indices.

The weightings that the layers 102, 104 of the ICE 100 apply at each wavelength are set to the regression weightings described with respect to a known equation, or data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. The ICE 100 may be configured to perform the dot product of the electromagnetic radiation received by the ICE 100 and the wavelength dependent transmission function of the ICE 100. The wavelength dependent transmission function of the ICE is dependent on the layer material refractive index, the number of layers 102, 104 and the layer thicknesses. The ICE 100 transmission function is then analogous to a desired regression vector derived from the solution to a linear multivariate problem targeting a specific component of the sample being analyzed. As a result, the output light intensity of the ICE 100 is related to the characteristic or analyte of interest.

The optical computing devices employing such an ICE may be capable of extracting the information of the spectral fingerprint of multiple characteristics or analytes within a substance and converting that information into a detectable output regarding the overall properties of the substance. That is, through suitable configurations of the optical computing devices, electromagnetic radiation associated with characteristics or analytes of interest in a substance can be separated from electromagnetic radiation associated with all other components of the substance in order to estimate the properties of the substance in real-time or near real-time.

According to one or more embodiments disclosed herein, discriminant analysis calculations, processing, methods, and/or techniques may be applied to output signals from optical elements, such as ICE components, or optical computing devices that employ such optical elements, in order to classify or quantify two or more sets of sample substances. As known in the art, discriminant analysis generally involves the determination of a linear equation configured to predict which group a particular case (e.g., a sample substance) belongs to. The form of a general discriminant analysis equation or function is shown in the following equation:

$$D = v_1 X_1 + v_2 X_2 + v_3 X_3 \ldots = v_i X_i + a \quad \text{Equation (1)}$$

where D is the discriminant function; v is the discriminant coefficient or weight for that variable; X is the respondent's score for that variable; a is a constant; and i is the number of predictor variables. The v's are un-standardized discriminant coefficients that serve to maximize the distance between the means of the criterion (dependent) variable. After using an existing set of data to calculate the discriminant function and classify known sample substances, any new unknown sample substance can then be classified, qualified, or otherwise quantified.

One or more exemplary methods or processes that use discriminant analysis in conjunction with a plurality of ICE components will now be described. In particular, FIGS. 2-7 may depict or otherwise illustrate a method for using qualitative discriminant analysis in conjunction with a plurality of ICE components in order to classify or otherwise categorize unknown sample substances. Those skilled in the art will readily appreciate that the ICE components and the discriminant analysis techniques or methods described herein may be used with any type or configuration of optical computing devices as known by those skilled in the art.

Figure 2:
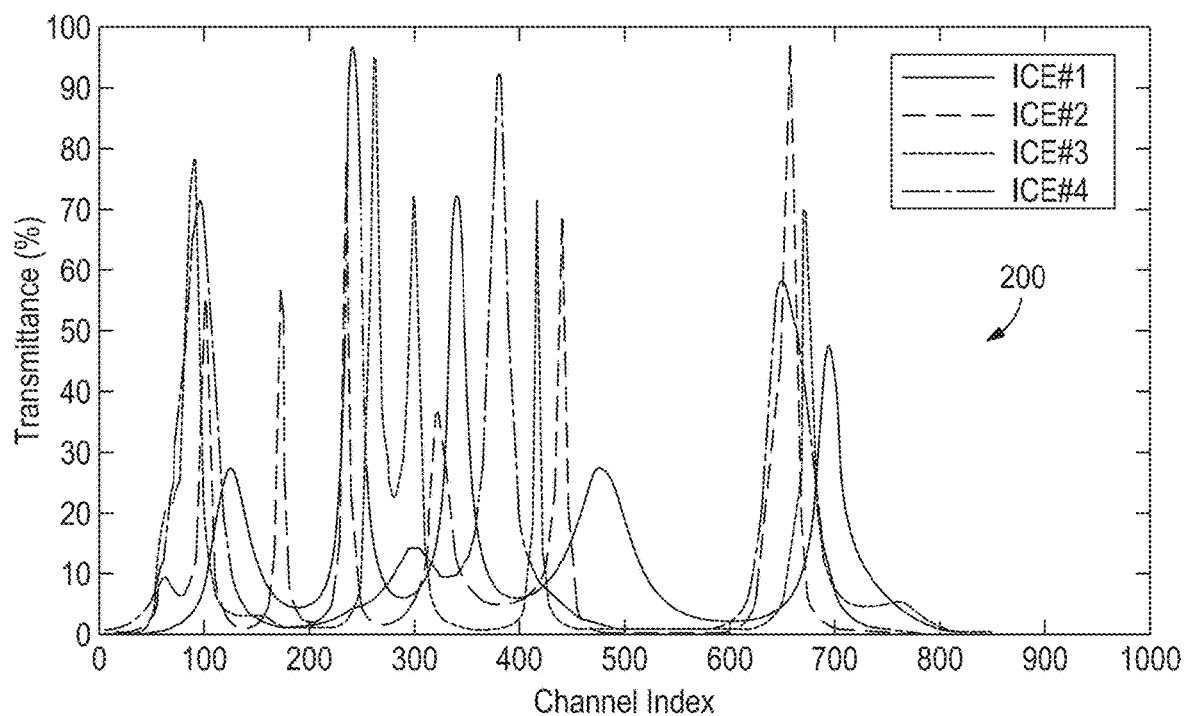
FIG. 2 illustrates exemplary transmittance spectra corresponding to a plurality of ICE components that are spanned over the optical wavelength of interest for a known substance.

Referring first to FIG. 2, illustrated is an exemplary transmittance spectrum 200 corresponding to a plurality of ICE components that have optically interacted with a particular substance. The substance may be, for example, a formation fluid, and each ICE component may be configured to detect a different characteristic of the formation fluid spanned over an optical wavelength of interest. FIG. 2 shows the convoluted transmittance spectrum 200 in simulation for four out of ten ICE components that were used in the following examples to optically interact with or otherwise monitor the substance. For purposes of clarity, the simulated transmittance spectrum 200 for the remaining six ICE components were omitted, but it should be noted that the data provided in the described embodiment is representative of data derived from a total of ten ICE components.

In operation, each ICE component acts as a multi-band filter and its respective optical response is linearly or non-linearly correlated with a particular characteristic (i.e., a particular physical or chemical property) of the substance (i.e., the formation fluid). In the illustrated example, for instance, ICE #1 may be configured to detect saturates in the substance, ICE #2 may be configured to detect aromatics in the substance, ICE #3 may be configured to detect resins in the substance, and ICE #4 may be configured to detect gas-to-oil ratio (GOR) in the substance. The remaining six ICE components not depicted in FIG. 2 for clarity purposes may be configured to detect other characteristics of the substance, such as asphaltenes, methane, ethane, propane, butane and propane, and density, for example.

Figure 3:
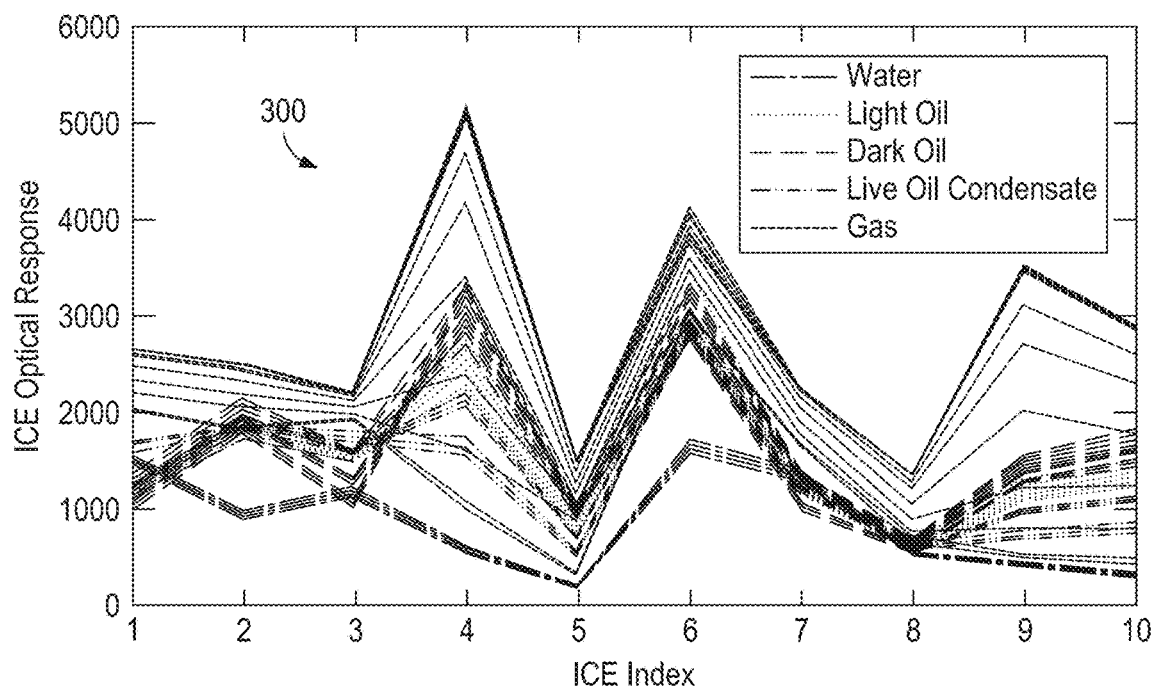
FIG. 3 illustrates optical responses of the plurality of ICE components used to create the transmittance spectra of FIG. 2.

Referring to FIG. 3, with continued reference to FIG. 2, illustrated are optical responses 300 of the plurality of ICE components used to create the transmittance spectrum 200 of FIG. 2. In particular, FIG. 3 illustrates the optical responses 300 for each of the ten ICE components in view of five different known fluid groups selected from an optical database. As used herein, the term "optical database" refers to a database that contains or otherwise has stored therein a full-range collection of fluid spectra over a variety of fluid types with each sample spectrum being measured with a commercial or traditional spectrometer under a number of specified or predetermined temperature and pressure combinations. As illustrated, the five fluid groups include water, light oil, dark oil, live oil condensate, and gas. Since each ICE component is configured to detect a different characteristic of the five or more fluid groups (i.e., saturates, aromatics, resins, asphaltenes, methane, ethane, propane, butane and propane, density, and GOR), the optical responses 300 for each ICE component are indicative of a concentration of each characteristic present in each of the fluid groups.

In one or more embodiments, an operator may be able to reference the optical responses 300 of FIG. 3 and generally identify the type or category of the sample fluid. In other words, once the optical responses 300 are recorded, a qualitative-type determination can be manually made through mere curve matching against known fluid types. As will be appreciated by those skilled in the art, the optical responses 300 of each ICE component may be measured in actual scale or normalized scale, in transmittance domain or in absorbance domain, without departing from the scope of the disclosure.

According to embodiments of the present disclosure, however, the optical responses 300 of FIG. 3 may be used to help train a neural network to perform qualitative discriminant analysis on an unknown sample substance or fluid, thereby helping to classify or categorize the unknown substance into a particular grouping or category. In exemplary usage, the trained neural network may help an operator classify an unknown formation fluid as heavy, medium, or light, for example. In other applications, the trained neural network may help classify an unknown formation fluid as having high or low concentrations of saturates, aromatics, resins, and asphaltenes (SARA). Such qualitative discriminant grouping or categorization may prove advantageous in enabling operators to optimize parameters or procedures.

Figure 4:
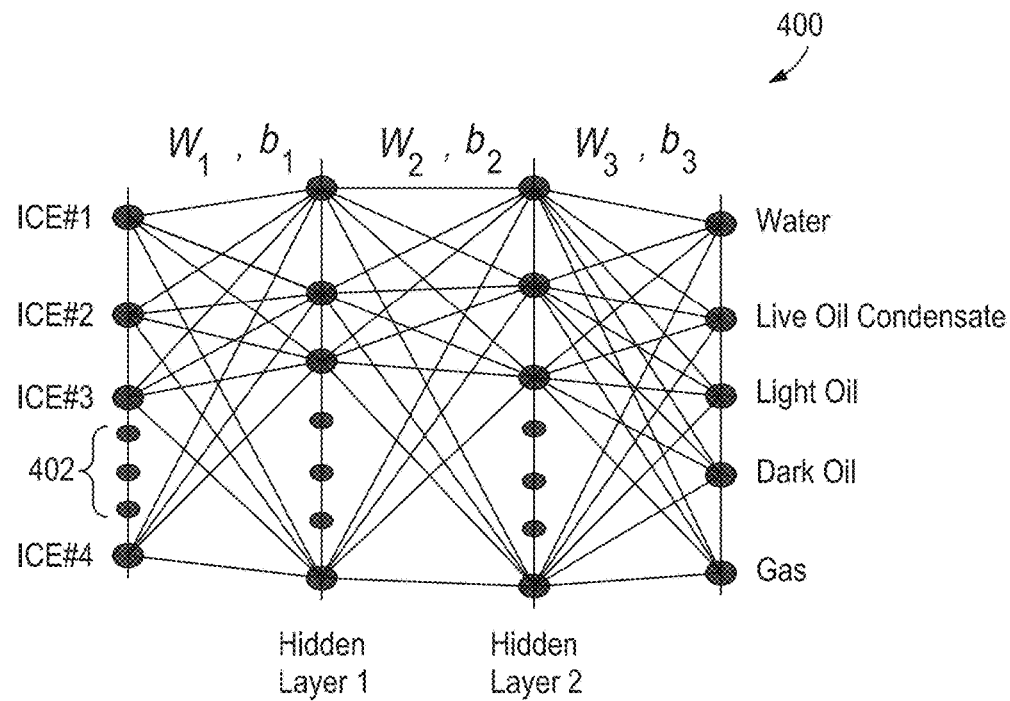
FIG. 4 illustrates an exemplary neural network structure for classifying a sample substance using qualitative discriminant analysis.

Referring now to FIG. 4, with continued reference to FIGS. 2 and 3, illustrated is an example neural network structure 400 that may be trained and subsequently used to classify or otherwise categorize an unknown sample substance. As used herein, the term "neural network" refers to a multivariate classification and/or regression (e.g., qualitative and/or quantitative) model for discriminant analysis. In some embodiments, as illustrated, the neural network structure 400 may include a plurality of ICE components as inputs. In particular, the neural network structure 400 may be configured to receive or otherwise process the optical responses 300 of FIG. 3 from the ten ICE components described therein. As depicted, the neural network 400 may receive an optical response input from ICE #1 configured to relate saturates indicator to fluid type, an optical response input from ICE #2 configured to relate aromatics indicator to fluid type, an optical response input from ICE #3 configured to relate resins indicator to fluid type, and an optical response input from ICE #4 configured to relate gas-to-oil ratio (GOR) indicator to fluid type.

The optical responses from the remaining six ICE components of the original ten, are represented by the ellipses 402 and are not fully illustrated in the neural network structure 400 for the sake of clarity. As briefly mentioned above, these remaining six ICE components are configured to relate the indicator of such characteristics as asphaltenes, methane, ethane, propane, butane and propane, and density to the fluid type in a sample fluid substance.

The neural network structure 400 may further have two hidden layers and five outputs that are configured to classify a sample substance as at least one of water, condensed fluid, light oil, dark oil (i.e., medium and heavy oils) and gas ($CH_4$ and $CO_2$). The neural network structure 400 may be generated and otherwise supported using a computer system that has a computer software program stored on a non-transitory computer-readable medium. In some embodiments, the computer software program may be MATLAB Neural Network Toolbox, but may alternatively be any other computer software capable of creating a neural network and applying principles of discriminant analysis thereto. For example, the computer software program may also include the IBM SPSS Statistics computer program, without departing from the scope of the disclosure.

Each output of the neural network 400 may represent or otherwise provide a probability value ranged from 0 to 1 of a particular fluid type for the given sample substance. Such probability values may be coded in five outputs. In some embodiments, for example, an output of pure water may be coded as [1 0 0 0 0], an output of live oil condensate may be coded as [0 1 0 0 0], an output of dead light oil may be coded as [0 0 1 0 0], an output of dead dark oil may be coded as [0 0 0 1 0], and an output of pure gas may be coded as [0 0 0 0 1].

In the illustrated example, 208 fluid samples of a known chemical and physical make-up were selected to help train the neural network 400. In particular, the 208 fluid samples consisted of 24 water samples, 21 live oil condensate samples, 70 light oil (dead) samples, 70 dark oil (dead) samples, and 23 gas samples measured at different (but known) temperature and pressure combinations. The ten simulated ICE components were then optically-interacted with the 208 selected fluid samples, and the resulting optical responses from the ten simulated ICE components were used to train the neural network structure 400. The resulting coefficient matrices are represented in the neural network structure 400 by $W_1$, $b_1$ on the first hidden layer, $W_2$, $b_2$ on the second hidden layer, and $W_3$, $b_3$ on the output layer.

Referring to FIGS. 5*a*-5*e*, with continued reference to FIG. 4, illustrated are exemplary classification outputs derived while training the neural network structure 400 of FIG. 4. In particular, the various classification outputs of FIGS. 5*a*-5*e* compare the neural network 400 prediction with a random noise corrupted target value on the five outputs, respectively, over all calibration and validation samples. For example, FIG. 5*a* displays the water index (i.e., the first output in the neural network 400) for each of the fluid samples. As illustrated, the water index registers a value of "1" for the first 24 samples and a value of "0" for the remaining samples, thereby indicating that the first 24 samples are water and the remaining samples are non-water samples.

Figure 5A:
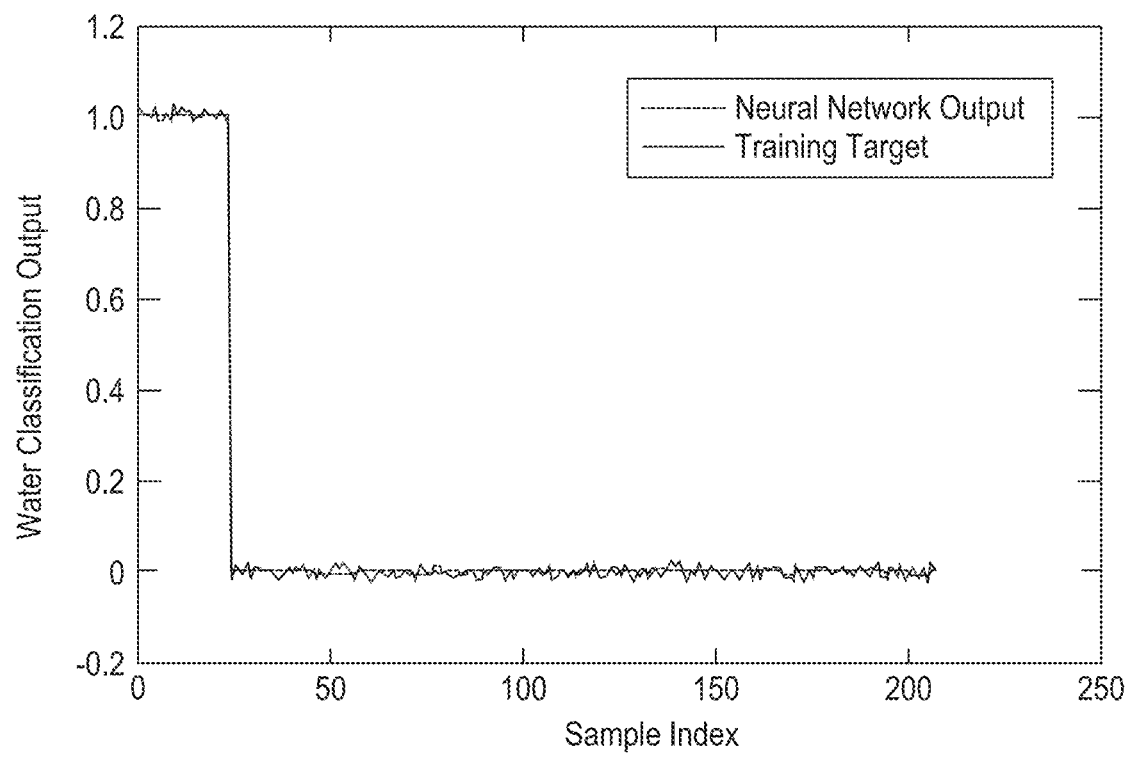
FIGS. 5a-5e depict exemplary classification outputs derived while training the neural network structure of FIG. 4.
Figure 5B:
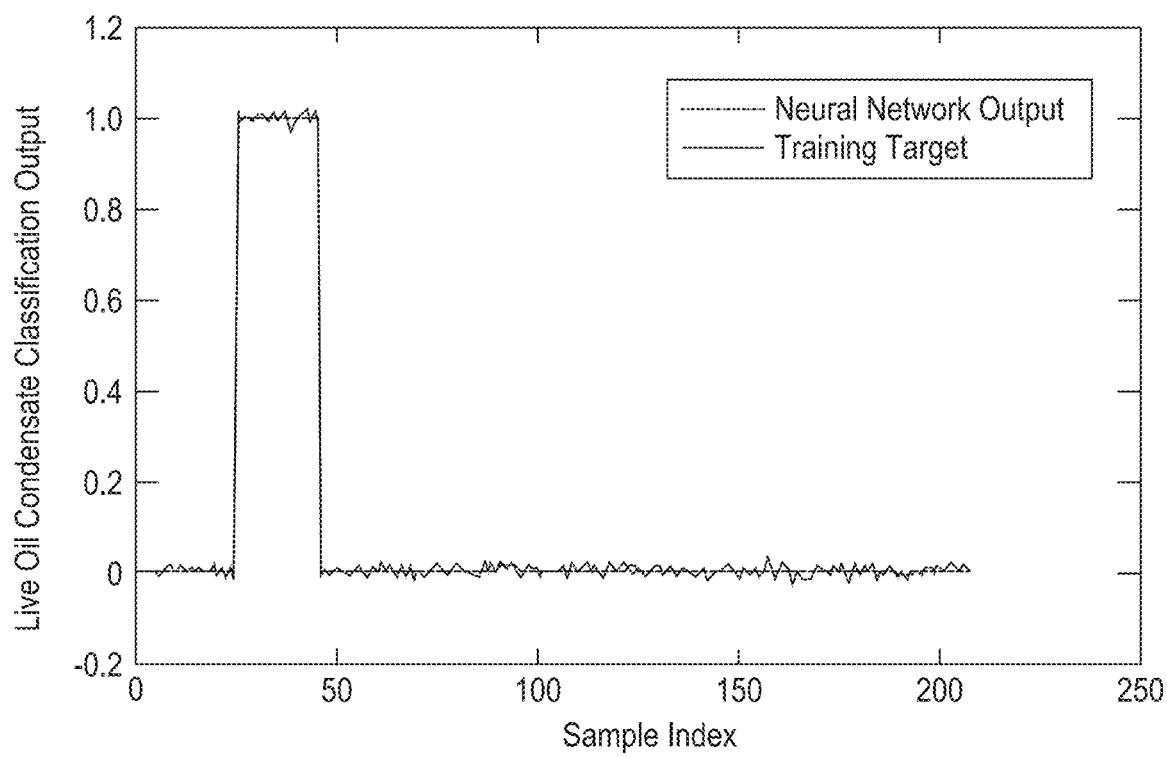
Figure 5C:
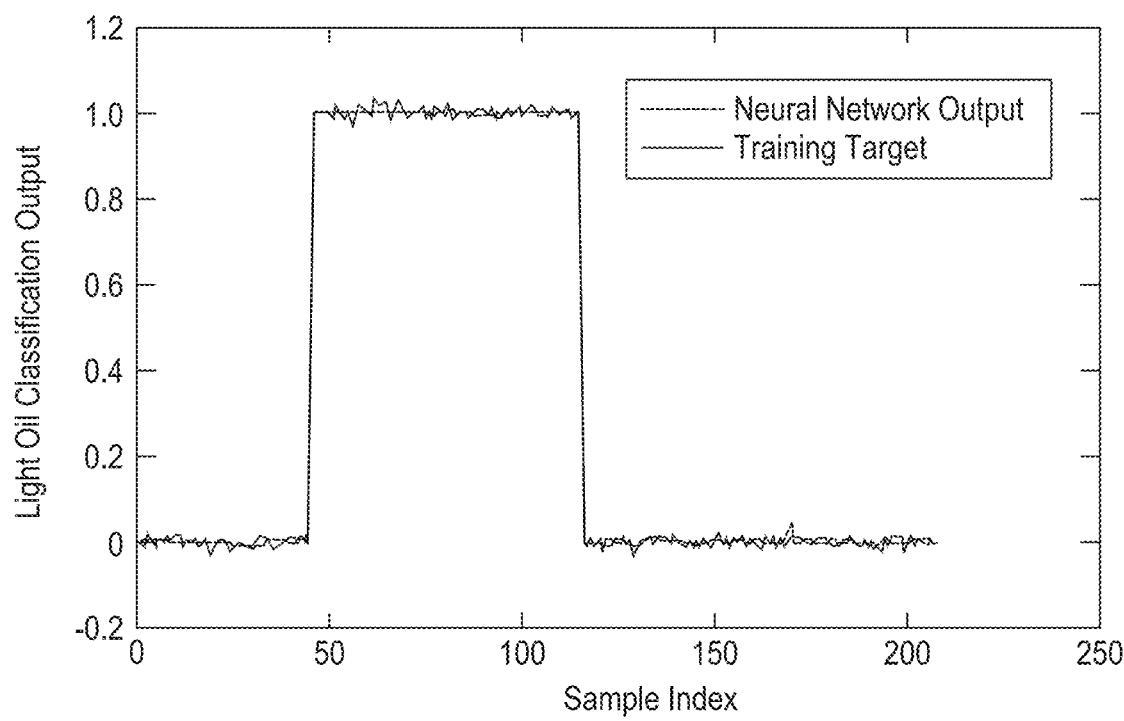
Figure 5D:
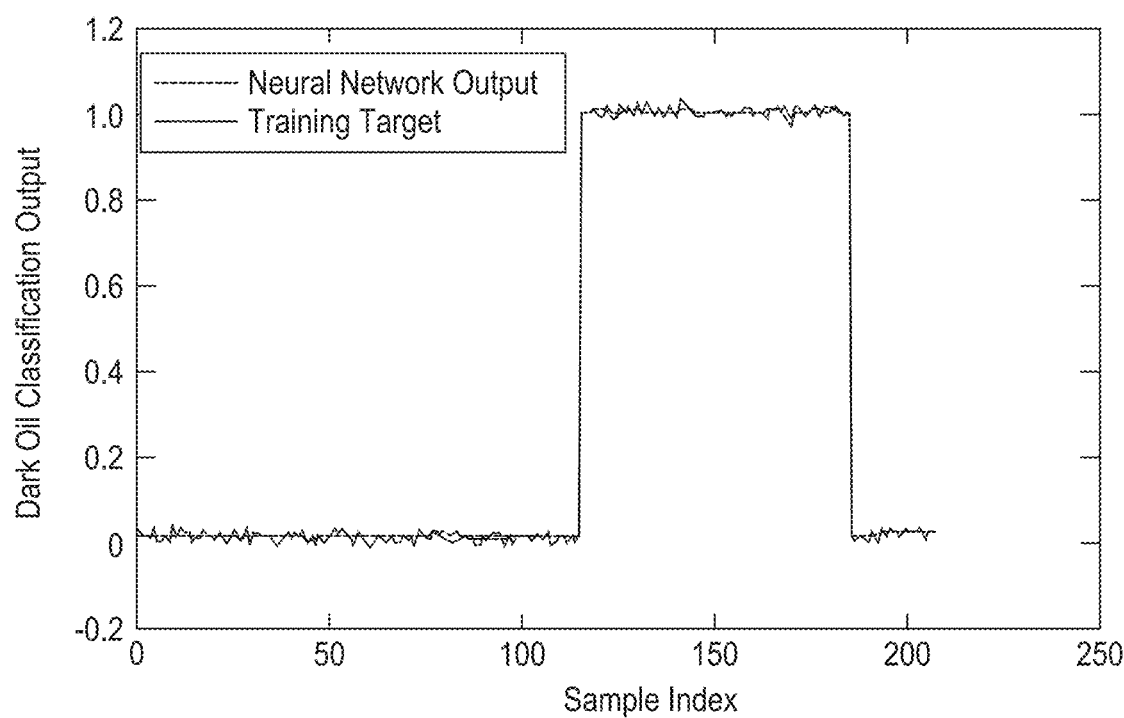
Figure 5E:
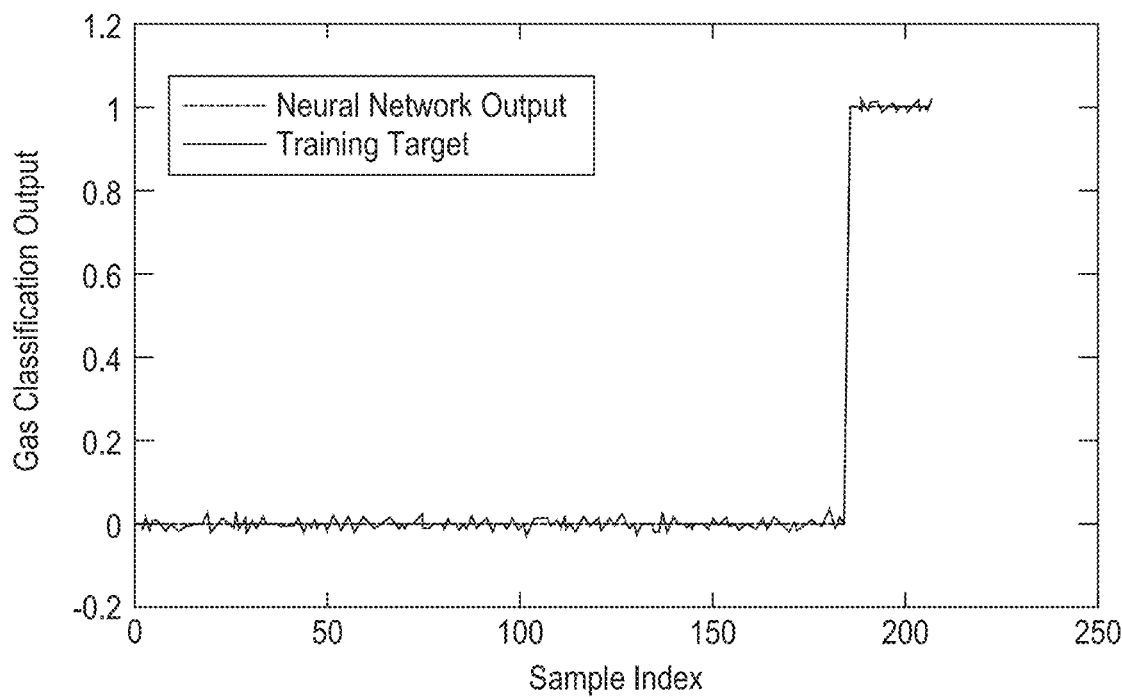

Similarly, FIG. 5*b* displays the live oil condensate index (i.e., the second output in the neural network 400) for each of the fluid samples. According to FIG. 5*b*, it can be concluded that samples 25 to 45 are live oil condensate fluid samples and the other samples are not. FIG. 5*c* displays the dead light oil index (i.e., the third output in the neural network 400) for each of the samples, and it can be concluded that samples 46 to 115 are dead light oil while the other samples are not. FIG. 5*d* displays the dead dark oil index (i.e., the fourth output in the neural network 400) for each of the samples, and it can be concluded that samples 116 to 185 are classified as dead dark oil while the others are not. FIG. 5*e* displays the gas index (i.e., the fifth output in the neural network 400) for each of the samples, and it can be concluded that the last 23 samples are gas samples while the others are not.

Now that the classification model of the neural network 400 has been trained using known pure samples corresponding to the particular output indices depicted in FIGS. 5*a*-5*e*, the neural network 400 may be used or otherwise employed to estimate corresponding proportions of similar substances present in unknown fluid samples or mixtures. In other words, unknown fluid samples may be processed with, by, or otherwise using the neural network 400 such that a qualitative discriminant analysis of each fluid sample may be obtained or undertaken in order to determine proportions of the fluid samples which correspond to the five outputs of the neural network 400 (i.e., pure water, live oil condensate, dead light oil, dead dark oil, and pure gas).

Figure 6:
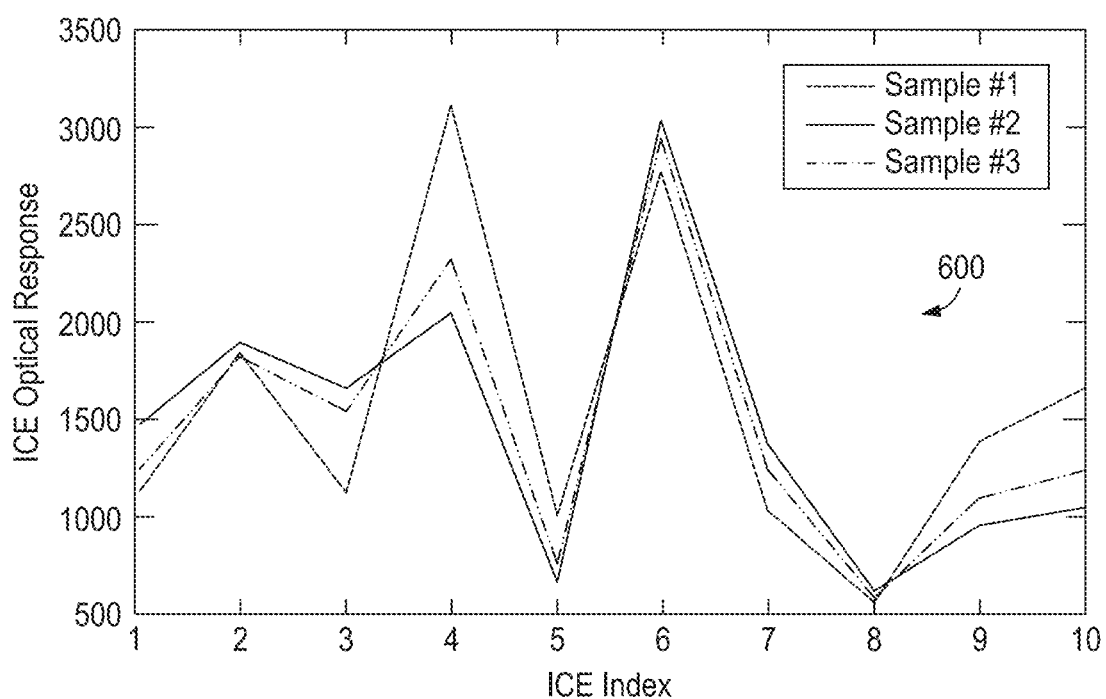
FIG. 6 illustrates the optical or spectral responses of ten ICE components in view of three unknown fluid samples.
Figure 7:
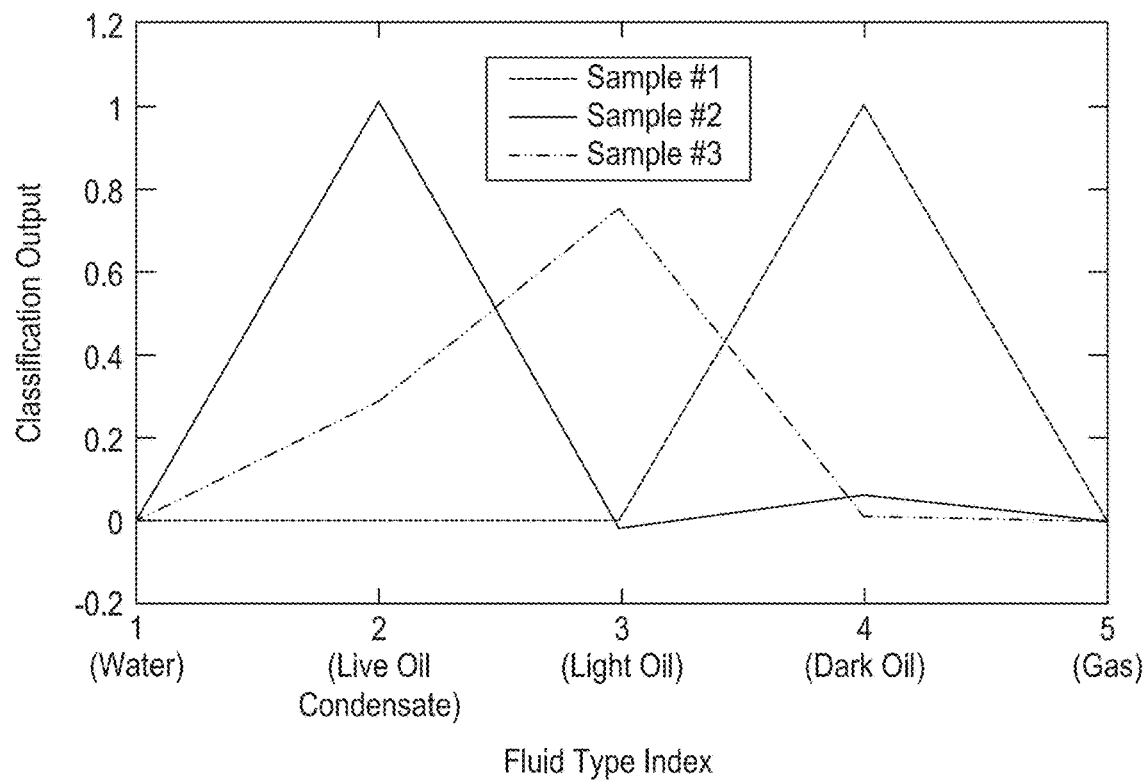
FIG. 7 illustrates fluid type index outputs for each of the three unknown fluid samples of FIG. 6 as corresponding to their respective optical responses.

FIGS. 6 and 7 demonstrate such an application of using the trained neural network 400 by testing three unknown samples, shown as Sample #1, Sample #2, and Sample #3. Specifically, FIG. 6 illustrates the optical or spectral responses 600 of the ten ICE components upon optically interacting with the three unknown fluid samples. The optical responses 600 of the ten ICE components may then be inputted into or otherwise applied to the classification model or trained neural network 400. FIG. 7 illustrates the fluid type index outputs for each of the three unknown fluid samples as corresponding to its respective optical response 600 after having been processed using the trained neural network 400. Accordingly, FIG. 7 depicts a predicted substance or fluid type for each of the samples as derived through the classification model.

As indicated in FIG. 7, by applying the classification model of the trained neural network 400, Sample #1 is classified as dead dark oil since the 4th index registers "1" and the other indices register "0". Sample #2, on the other hand, is highlighted as likely fluid of live oil condensate since the 2nd index registers "1" and the other indices register "0" or near "0". A non-zero output is registered on the 4th index for Sample #2, thereby indicating that Sample #2 likely contains at least some dark oil. Since the dark oil index is smaller than "0.1", however, its slight influence may be generally ignored by an operator for purposes of qualitative analysis. In other words, the predicted substance type of Sample #2 corresponds to the highest probability as calculated by the classification model, which is more likely to correspond to live oil condensate over dark oil.

The testing results for Sample #3 provide an output of about "0.3" for live oil condensate and about "0.7" for light oil. Such results may indicate to an operator that the optical response for Sample #3 possesses features or characteristics of both basic fluids. Since Sample #3 registers more predominantly as a light oil as opposed to a live oil condensate, an operator may be able to qualitatively classify Sample #3 as a light oil.

As described in greater detail below, however, the intermediate index values for Sample #3 may be used as weighting factors for quantitative calibration or discrimination analysis if each type of fluid (i.e., live oil condensate and light oil) has its own calibration model. In determining a particular chemical concentration or quantity of the Sample #3, for example, the solution could be the weighted sum of the outputs of the live oil condensate model and the condensed fluid model. In other words, the predicted substance type for Sample #3 may correspond to a mathematical linear combination between classification models for each of live oil condensate and light oil. Such a determination is at least one example of quantitative discriminant analysis.

The neural network 400 of FIG. 4 is depicted and described merely for illustrative purposes and therefore should not be considered as limiting to the scope of the present disclosure. Rather, the present disclosure further contemplates the generation and training of neural networks that use more or less than 10 ICE components and provide results in more or less than five output indices, without departing from the scope of the disclosure.

Figure 8:
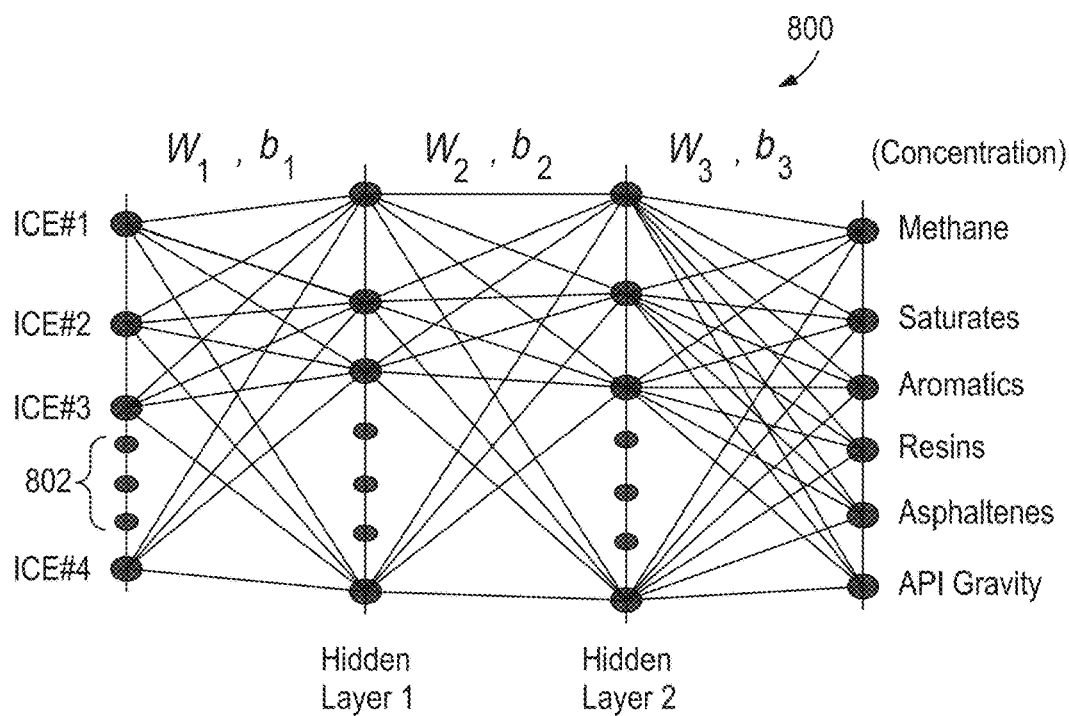
FIG. 8 illustrates an exemplary neural network structure for quantifying a sample substance using quantitative discriminant analysis.

In addition to qualifying or categorizing an unknown sample substance into a particular chemical grouping based on optical spectroscopic data, as generally described above, discriminant analysis can also aid in the quantitative determination of a chemical property or characteristic of an unknown sample. According to one or more embodiments, optical responses from a plurality of ICE components based on known samples from the optical database may be used as inputs to build one or more quantitative calibration models for quantitative discriminating analysis with non-linear neural networks. More particularly, and with reference to FIG. 8, illustrated is another example neural network structure 800 similar in some respects to the neural network structure 400 of FIG. 4.

Similar to the neural network 400, the neural network 800 may be generated and otherwise processed using a computer system that employs a computer software program (e.g., MATLAB Neural Network Toolbox, IBM SPSS Statistics, etc.) stored on a non-transitory computer-readable medium. Moreover, similar to the neural network 400, the neural network may be trained using a plurality of optical responses for a corresponding plurality of ICE components in view of several different fluid samples selected from the optical database. In the present embodiment, the optical responses used to train the neural network 800 may be similar to those shown in FIG. 3 above, but with more variations in data range since it may encompass more fluid samples.

The neural network structure 800 may also use a plurality of ICE components and their respective optical responses as inputs. In particular, the neural network structure 800 may use a response from ICE #1 configured to detect saturates, a response from ICE #2 configured to detect aromatics, ICE #3 configured to detect resins, and ICE #4 configured to detect gas-to-oil ratio (GOR). Responses from any remaining ICE components are represented by the ellipses 802 and are not fully illustrated in the neural network structure 800 for clarity.

Unlike the neural network 400 of FIG. 4 which classifies a sample substance using five outputs, the neural network 800 may be configured to quantify a sample substance in terms of fluid concentration or other properties or characteristics of interest over six outputs. As depicted in FIG. 8, for example, the exemplary neural network structure 800 may be configured for the quantitative analysis of fluid concentrations of methane, saturates, aromatics, resins, asphaltenes, and API gravity as the six model outputs.

The neural network 800 is depicted and described merely for illustrative purposes and should not be considered as limiting to the scope of the present disclosure. Rather, the present disclosure further contemplates the generation and training of a neural network that provides a quantitative model that results in more or less than six output indices (including a single output). Moreover, the fluid properties to be predicted through quantitative calibration are also not limited to the ones indicated in FIG. 8. Instead, other fluid properties, including concentrations of $C_2$-$C_6$, $CO_2$, $H_2O$, $H_2S$, and GOR, for example, may also be predicted with either a single output or multi-output neural network quantitative models using the same or different ICE components and their respective optical responses as inputs.

Although the application of the neural networks 400, 800 of FIGS. 4 and 8, respectively, may be different in purpose (i.e., pattern recognition and/or classification for qualitative analysis using the neural network 400, and function approximation for quantitative analysis using the neural network 800), the model structures in each case may be somewhat similar, such as being implemented with two hidden-layer neural networks. The transfer function used on each hidden layer may be a non-linear, hyperbolic tangent sigmoid function. In contrast, the transfer function used on the output layer may be a linear function.

Computing the net outputs of each neural network 400, 800 may follow the following equations:

$$a_1 = f_1(n_1) = \frac{e^{n_1} - e^{-n_1}}{e^{n_1} + e^{-n_1}} \quad \text{Equation (2)}$$

$$n_1 = W_1 * P + b_1 \quad \text{Equation (3)}$$

$$a_2 = f_2(n_2) = \frac{e^{n_2} - e^{-n_2}}{e^{n_2} + e^{-n_2}} \quad \text{Equation (4)}$$

$$n_2 = W_2 * a_1 + b_2 \quad \text{Equation (5)}$$

$$a_3 = f_3(n_3) = n_3 = W_3 * a_2 + b_3 \quad \text{Equation (6)}$$

where P is a forward input vector, $W_1$, $b_1$, $W_2$, $b_2$, and $W_3$, $b_3$ are the connecting or weighting matrices or vectors and $n_1$, $n_2$, $n_3$, $a_1$, $a_2$, and $a_3$ are net inputs and net outputs at different layers. In exemplary operation, each neural network 400, 800 feeds the forward input vector P though multiple layers to calculate the respective output(s).

Figure 9A:
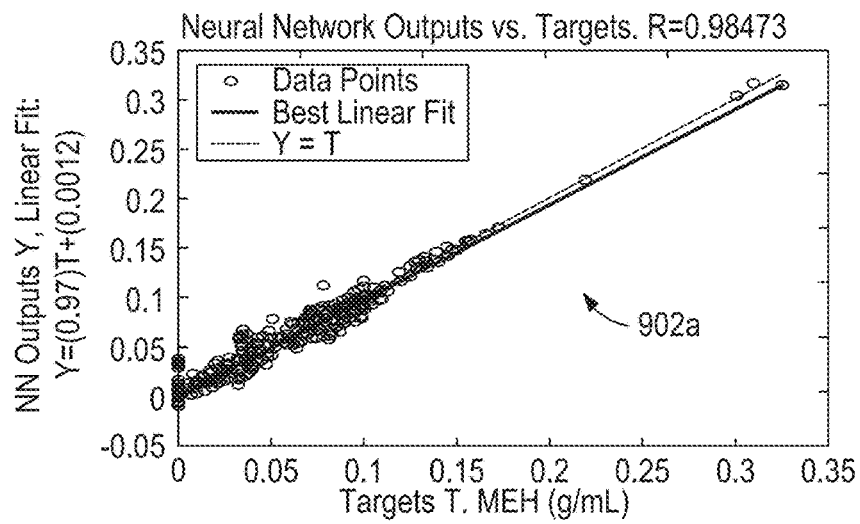
FIGS. 9a-9f provide six comparison plots for six calibration models, respectively, according to one or more embodiments.
Figure 9B:
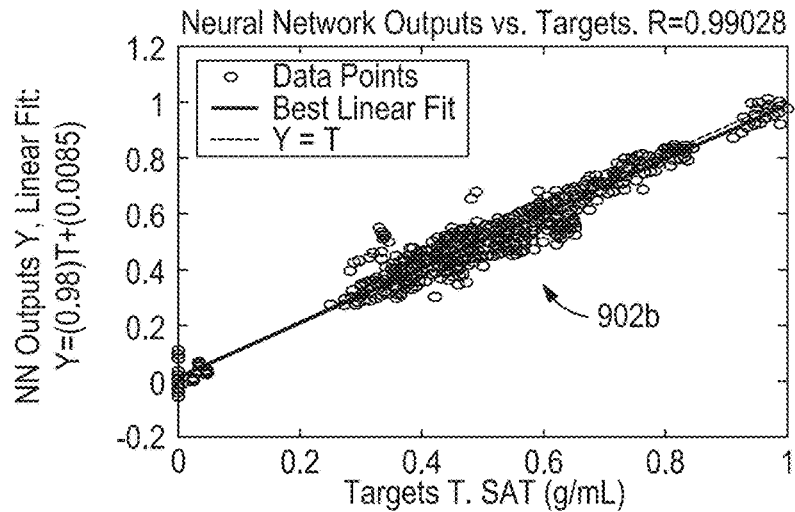
Figure 9C:
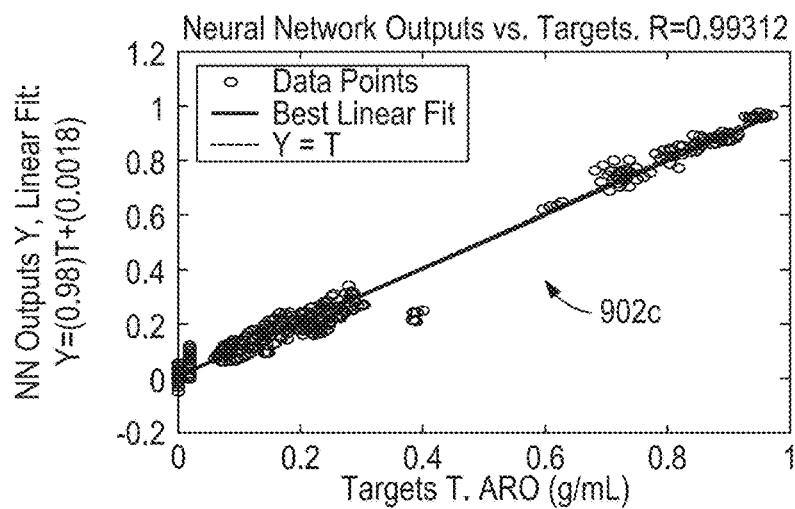
Figure 9D:
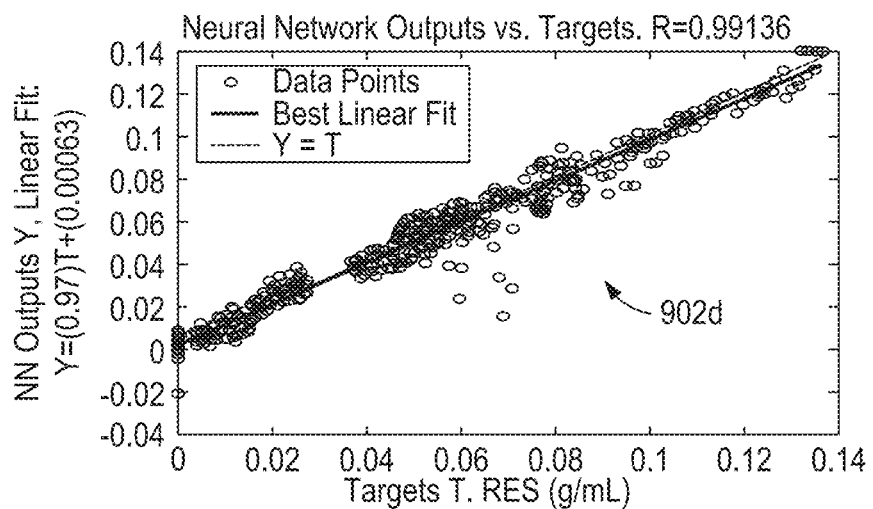
Figure 9E:
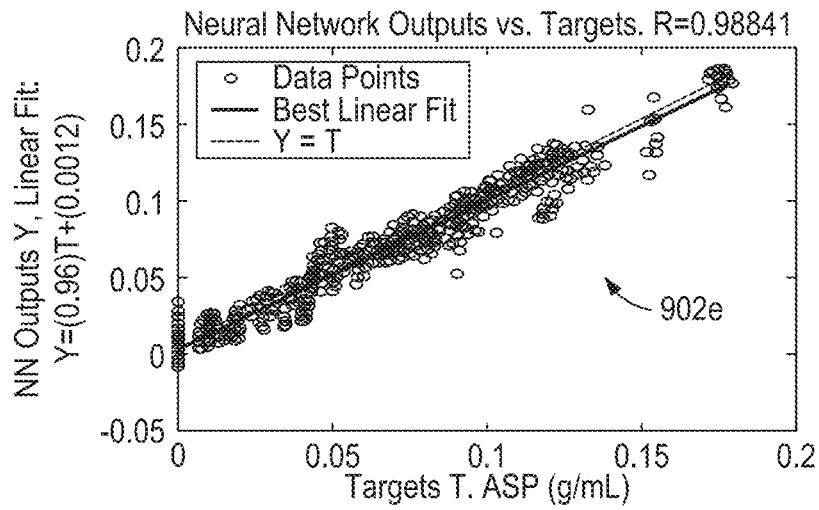
Figure 9F:
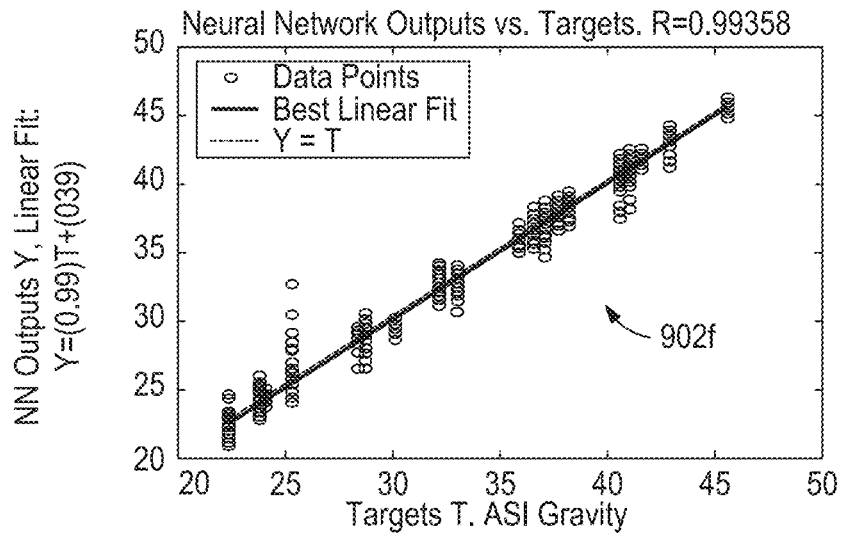

Referring now to FIGS. 9a-9f, with continued reference to FIG. 8, illustrated are six comparison plots for six quantitative calibration models, respectively, according to one or more embodiments. In particular, FIGS. 9a-9f compare the prediction of the quantitative neural network 800 with actual measurements for the six separate calibration models for over more than forty different sample fluids. FIG. 9a illustrates a comparison plot 902a for methane concentrations; FIG. 9b illustrates a comparison plot 902b for saturates concentrations; FIG. 9c illustrates a comparison plot 902c for aromatics concentrations; FIG. 9d illustrates a comparison plot 902d for resins concentrations; FIG. 9e illustrates a comparison plot 902e for asphaltenes concentrations; and FIG. 9f illustrates a comparison plot 902f for API gravity concentrations. For each of these plots 902a-f, a linear fit equation and correlation coefficient R are generated to show the proximity of neural network (NN) prediction Y and the actual target value T. Typically, a value of near "1" for slope and near "0" for intercept in the linear fit equation will indicate high accuracy of calibration model if the correlation coefficient value R is also close to 1.

The relative calibration error, which may be determined using the root-mean-squared error over the calibration data points divided by the parameter range calculated from the boundary values of x-axis in each plot, is from the minimum 1.77% (corresponding to methane) to the maximum 3.67% (corresponding to asphaltenes) in these examples. At least one advantage of using the neural network 800 for quantitative discriminating analysis is its robustness in including samples of all fluid types into a single model. Moreover, sample selection may not be required or crucial in general, which may prove advantageous in convenience for quantitative calibration model development.

In other embodiments, however, partial least square (PLS) regression may be used to develop linear quantitative calibration models using the multi-ICE component optical responses as inputs. In such embodiments, sample selection and optical response transformation might be required to construct a fluid type based model for better application.

It should be noted that for both the non-linear neural network and the linear PLS quantitative analysis, the particular fluid property or characteristic is not only modeled with the optical response of its corresponding ICE component as an input alone, but also modeled with inputs of other optical responses from other ICE components to overcome limitations associated with single ICE component realization. For example, saturates are not modeled only with the optical response of ICE #1 (i.e., the ICE component configured to detect saturates) as a lone input optical response, but saturates may also be modeled with inputs of other optical responses from the remaining ICE components, thereby providing a multi-band filter application.

Also, it will be appreciated that multiple designs for ICE components configured to detect the same property or characteristic may be used as calibration inputs for quantitative model development. For example, saturates may be detected or otherwise monitored using several different designs of ICE components configured to detect saturates.

Figure 10:
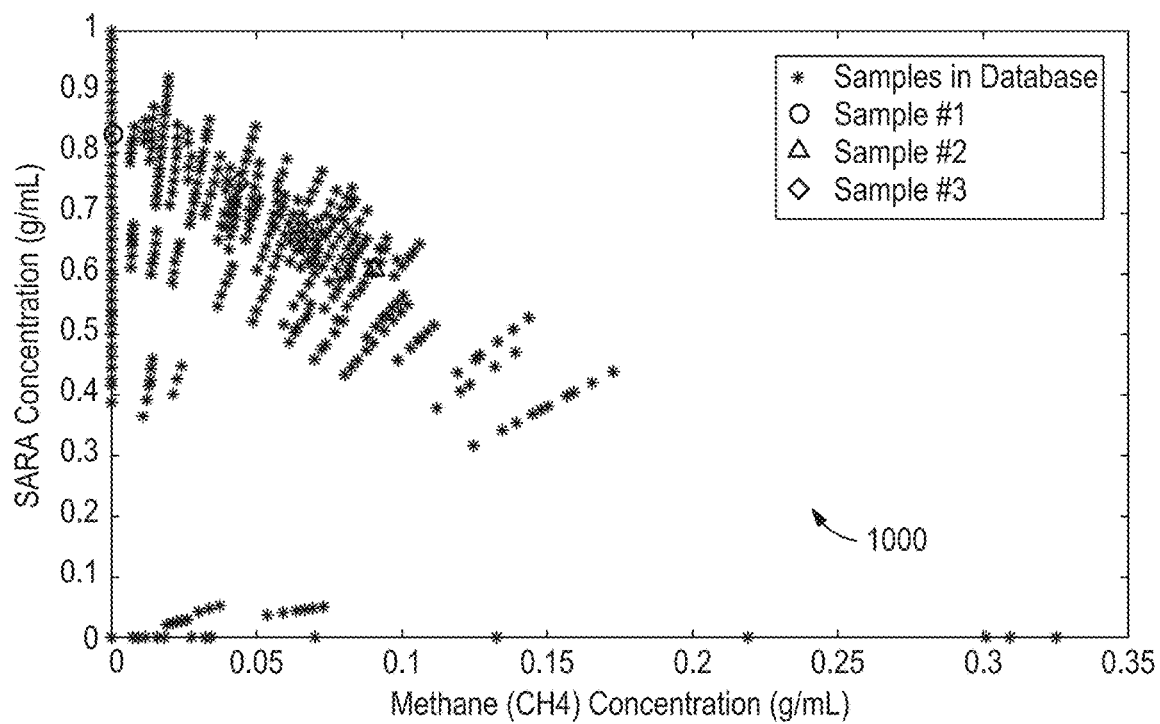
FIG. 10 illustrates a cross plot that provides quantitative measurement data derived from the trained neural network of FIG. 8 upon testing three unknown samples, according to one or more embodiments.
Figure 11:
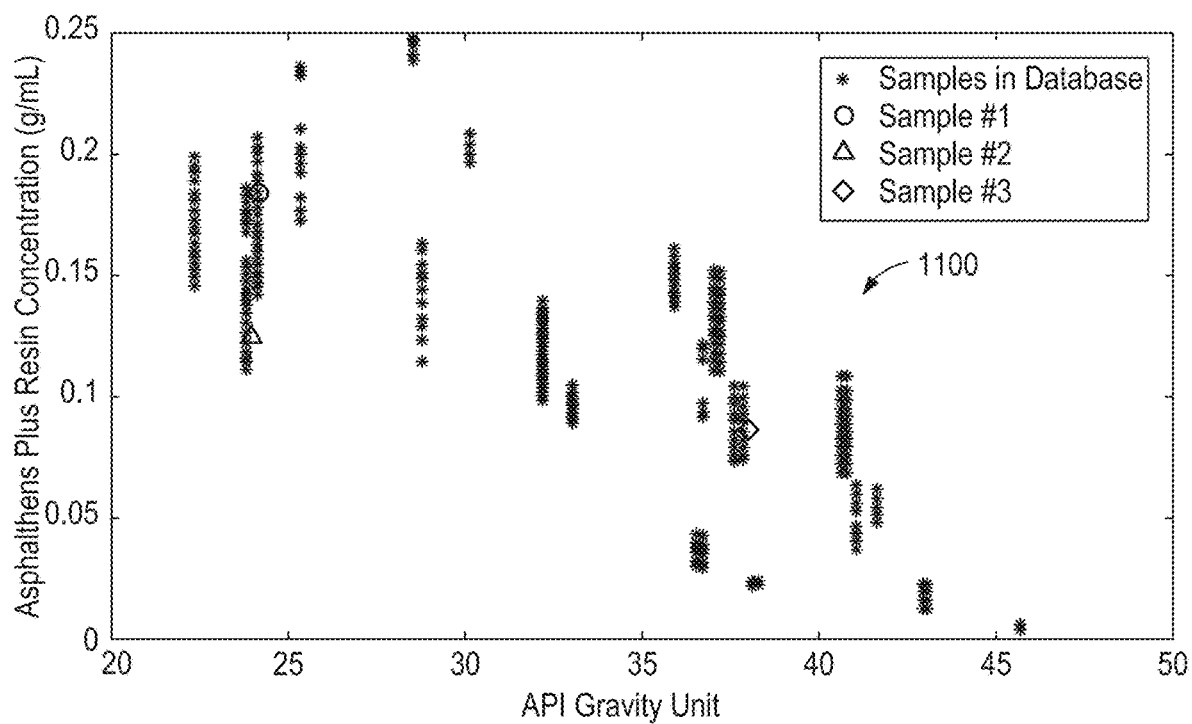
FIG. 11 illustrates another cross plot that provides quantitative measurement data derived from the trained neural network of FIG. 8 upon testing three unknown samples, according to one or more embodiments.

Referring now to FIGS. 10 and 11, illustrated are cross plots 1000 and 1100, respectively, providing quantitative measurement data derived from the trained neural network 800 upon testing three unknown samples, shown as Sample #1, Sample #2, and Sample #3. In particular, background data in the cross plot 1000 of FIG. 10 depicts SARA concentration (i.e., the sum of saturates, aromatics, resins and asphaltenes) versus methane concentration over a variety of known fluid samples derived from the optical database. Similarly, the cross plot 1100 of FIG. 11 depicts API gravity versus the sum of asphaltenes and resins concentration over fluid samples derived from the optical database. The three samples may be the same three unknown samples described above with reference to FIGS. 6 and 7. Accordingly, the cross plots 1000 and 1100 may show how qualitative analysis can be combined with quantitative analysis to discriminate/identify fluid properties of one or more unknown samples.

With reference to FIG. 10, the known sample points of the database that land on or are otherwise generally located near the X-axis are samples that contain little to no SARA components but instead exhibit high methane concentrations. Such samples indicate typical gas characteristics. On the other hand, the sample points that land on or are otherwise generally located on or near the Y-axis are samples that contain little or no methane but instead exhibit differing concentrations of SARA. Such samples can be indicative of dead oils and other dead fluids, such as toluene, hexane, naphthalene, and silicone oil. The origin point (0,0) in the cross plot 1000 represents substances like pure water, $CO_2$, $N_2$, ethane, and propane without $CH_4$ and SARA in its composition. As can be appreciated, the known sample points of the database not located on the X-axis or the Y-axis have both SARA and methane in composition.

The resulting qualitative analysis described above in FIG. 7 indicates that Sample #1 is likely dark oil, Sample #2 is likely live oil condensate, and Sample #3 is a combination of live oil condensate (approximately 30%) and light oil (approximately 70%). By applying the quantitative calibration models of the neural network 800, the concentration of the three testing samples on methane, saturates, aromatics, resins, asphaltenes, and GOR may be calculated or otherwise determined. The corresponding concentrations of SARA and methane for each sample may be plotted in the cross plot 1000 of FIG. 10. According to the cross plot 1000, for example, the methane and SARA concentration for Sample #1 is about 0.0003 and about 0.8309 (g/mL), respectively, for Sample #2 is about 0.0906 and about 0.6047 (g/mL), respectively, and for Sample #3 is about 0.044 and about 0.7484 (g/mL). Such determinations agree with the previous findings of FIG. 7 for each sample.

With reference to FIG. 11, the API gravity can be converted from the oil stock tank condition density, which may be a good indicator of oil types (e.g., dark oil and light oil) when used in conjunction with asphaltenes and resins. The sample points that exhibit high API gravity and low concentration of asphaltenes and resins content are typically indicative of light oils. On the other hand, the sample points that exhibit low API gravity and high concentration of asphaltenes and resins are typically indicative of dark oils. As depicted in FIG. 11, the co-relation between API gravity and the concentration of asphaltenes and resins is not purely linear. Rather, significant variations over particular data ranges can often be observed, depending on many other factors.

After applying the API gravity quantitative calibration model of the neural network 800, and recalculating the concentration of asphaltenes plus resins, the cross plot 1100 of FIG. 11 may be able to show the corresponding points for each of Samples #1, #2, and #3. As indicated in the cross plot 1100, Sample #1 appears to fit the characterization of dark oil because of its relatively high concentration of asphaltenes plus resins and low concentration of API gravity. The stock tank oil density can be high for live oil condensate (i.e., the gas contents can be removed), leading to relatively low API gravity for sample #2, and its asphaltenes plus resins concentration is reasonably lower than dark oil. The partial light oil characteristics of Sample #3 make its API gravity higher than the other samples. Moreover, its concentration of asphaltenes plus resins is within the normal range, as shown in the cross plot 1100.

In some embodiments, a qualitative analysis of an unknown sample may first be undertaken or performed using a trained multivariate classification model (such as the neural network 400 of FIG. 4) when new data is acquired to initially determine the category or type of fluid. Subsequently, a quantitative analysis of the unknown sample using a quantitative model (such as the neural network 800 of FIG. 8) may be undertaken or performed in order to calculate or otherwise quantify one or more fluid properties in detail and compare them with information stored in an optical database to evaluate if the quantitative prediction is reasonable. A general agreement between qualitative analysis and quantitative analysis may prove advantageous in helping an operator or analyst make a more confident determination or decision. Any disagreement between the qualitative and quantitative analyses, however, may indicate the limitation of existing neural network models and database and help flag the uncertainty of prediction.

Several applications may be optimized using the calibration models described herein. For example, the trained neural network 800 may prove advantageous in performing discriminant analyses to optimize the quantitative calibration of an optical computing device for a particular characteristic or property of an unknown substance under study. In some embodiments, quantitative calibration models may be trained or otherwise generated for a large number of fluid types, thereby generating a large library of calibrations. Theoretically, quantitative calibration models could be generated for every type of oil worldwide, for example. Upon encountering an unknown downhole fluid, such as an oil, the large library of quantitative calibration models may prove advantageous in directing an operator to the exact oil composition and concentration. Such a process of generating calibration models for every type of oil, however, could be fairly time-consuming and otherwise inefficient.

In other embodiments, however, a small library of quantitative calibration models could be generated for a few types of fluids, such as types of oils. Upon encountering an unknown downhole fluid, the small library of quantitative calibration models may prove advantageous in directing an operator to the nearest neighbor of the true unknown fluid. While such an embodiment only requires the development of a small number of calibrations, as opposed to the large library described in the previous embodiment, the small number of calibrations may only provide an operator with an approximation.

In yet other embodiments, the small library of quantitative calibration models described above may fail to provide an adequate approximation or "nearest neighbor" to the unknown substance or fluid. In such embodiments, a new calibration model may be generated based on the closest calibrations from the small library. The closest calibration models may be configured or otherwise used to fine-tune a more accurate calibration for quantifying the concentration of the unknown substance or fluid.

In yet other embodiments, the calibration models described herein may prove advantageous in use with other sensing or measurement devices, such as spectrometers, densitometers, temperature and pressure gauges, etc. For example, the calibration models may prove useful in recalibrating such devices and/or instruments, such that the instruments are able to perform more precisely.

It should be noted that while the embodiments discussed herein use integrated computational elements as an optical element, it is further contemplated herein to use any other optical element known to those skilled in the art. For example, suitable optical elements that may be used in any of the disclosed embodiments include, but are not limited to, holographic optical elements, acousto-optic tunable filters, and liquid crystal tunable filters.

The methods described herein, or large portions thereof, may be automated at some point such that a computerized system may be programmed to create a neural network and apply discriminant analysis techniques thereto in order to qualify or quantify an unknown sample substance. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method, comprising:
    training a first model with optical response as inputs and with known spectrums of known substances to generate a classification model, wherein training the first model comprises generating a plurality of classification outputs and comparing the plurality of classification outputs from the first model with a random noise corrupted target value corresponding to each of the classification outputs;
    optically interacting a plurality of optical elements of an optical computing device with an unknown substance to generate an unknown substance optical response, wherein the optical computing device is configured to receive an input of an electromagnetic radiation;
    indicating the unknown substance optical response to the classification model that outputs a predicted substance type;
    classifying the unknown substance to a known chemical grouping based on the predicted substance type; and
    modifying at least one of a measurement parameter and a sampling procedure for subsequent sampling of the unknown substance, based on the known chemical grouping.

2. The method of claim 1, wherein the predicted substance type corresponds to a highest probability as calculated by the classification model.

3. The method of claim 1, further comprising:
    generating at least one quantitative model corresponding to at least one of the known substances;
    using the predicted substance type corresponding to the unknown substance to select the at least one quantitative model;
    applying the at least one quantitative model to provide an unknown substance property prediction; and
    validating the unknown substance property prediction by referencing an optical database that indicates the known substances and known spectrums.

4. The method of claim 1, further comprising:
indicating to a calibration model one or more values output from the classification model; and
quantifying a concentration of the predicted substance types in the unknown substance based on values output from the calibration model.

5. The method of claim 1 further comprising indicating a new fluid type based on a determination that the predicted substance type corresponds to a mathematical combination of at least two substance types of the known substances.

6. The method of claim 5, further comprising:
adding a new fluid type to an optical database that indicates the known spectrums and the known substances.

7. The method of claim 5, further comprising:
generating a new optical response from each optical element for the new fluid type; and
training a second model with the new optical responses, the optical responses, and the known spectrums as input to generate a new classification model.

8. A method, comprising:
training a first model with optical responses as inputs and with known spectrums of known substances to generate a classification model, wherein training the first model comprises generating a plurality of classification outputs and comparing the plurality of classification outputs from the first model with a random noise corrupted target value corresponding to each of the classification outputs;
optically interacting a plurality of optical elements of an optical computing device with an unknown substance to generate an unknown substance optical response, wherein the optical computing device is configured to receive an input of an electromagnetic radiation;
indicating the unknown substance optical response to the classification model which outputs a predicted substance type;
classifying the unknown substance to a known chemical group based on the predicted substance type; and
modifying at least one of a measurement parameter and a sampling procedure for subsequent sampling of the unknown substance, based on the known chemical grouping.

9. The method of claim 8, wherein training the first model comprises:
optically interacting the plurality of optical elements with the known substances, each optical element being configured to generate an interacted light having intensity that is related to a particular characteristic of the substances; and
for each of the known substances, generating an optical response based on the intensity of the interacted light from each optical element corresponding to each known substance, wherein each known substance corresponds to the known spectrum stored in an optical database.

10. The method of claim 8, wherein the predicted substance type corresponds to a highest probability as calculated by the classification model.

11. The method of claim 8, further comprising:
adding a new fluid type and the unknown substance optical response to an optical database that indicates the known spectrums and the known substances.

12. The method of claim 8, further comprising classifying the predicted substance type with respect to at least one of the known substances.

13. The method of claim 8, further comprising:
indicating to a calibration model one or more values output from the classification model; and
quantifying a concentration of the predicted substance types in the unknown substance based on values output from the calibration model.

14. The method of claim 8, wherein training the first model comprises minimizing a difference between an output of the first model with a value for the known substances, the method further comprising iteratively updating at least one connecting matrix or vector used to calculate a neural input of a transfer function in a hidden layer or an output layer of the classification model, to reduce the difference.

15. A system, comprising
an optical computing device having an integrated computational element, the optical computing device configured to interact an electromagnetic radiation with a sample to generate a first optical response;
a processor; and
a memory having stored therein instructions and a classification model, wherein the instructions are executable by the processor to cause the system to:
train a first model with optical responses as inputs and with known spectrums of known substances to generate the classification model, wherein instructions executable by the processor to cause the system to train the first model comprise instructions executable by the processor to cause the system to generate a plurality of classification outputs and compare the plurality of classification outputs from the first model with a random noise corrupted target value corresponding to each of the classification outputs,
indicate a first optical response from the optical computing device to the classification model, wherein the first optical response is for a sample that includes an unknown substance;
classify the unknown substance to a known chemical group based on a predicted substance type output by the classification model based on indication of the first optical response to the classification model, and
determine an adjustment in at least one of a measurement parameter and a sampling procedure for subsequent sampling of the unknown substance based on the known chemical grouping of the sample.

16. The system of claim 15, wherein the classification model further comprises instructions which, when executed by the processor, cause the system to determine when the optical response comprises a corrupted target value.

17. The system of claim 15, wherein the classification model further comprises instructions which, when executed by the processor, cause the system to determine a concentration of the unknown substance in the sample.

18. A method, comprising:
training a first model with optical responses as inputs and with known spectrums of known substances to generate a classification model, wherein training the first model comprises generating a plurality of classification outputs and comparing the plurality of classification outputs from the first model with a random noise corrupted target value corresponding to each of the classification outputs;
optically interacting a plurality of optical elements of an optical computing device with an unknown substance to generate an unknown substance optical response, wherein the optical computing device is configured to receive an input of an electromagnetic radiation;

indicating the unknown substance optical response to a classification model that outputs a predicted substance type; and classifying the unknown substance to a known chemical grouping based on the predicted substance type.

19. The method of claim 18 further comprising indicating a new fluid type based on a determination that the predicted substance type corresponds to a mathematical combination of at least two substance types of the known substances.

20. The method of claim 19, further comprising:

generating a new optical response from each optical element for the new fluid type; and training a second model with the new optical responses, the optical responses, and the known spectrums as input to generate a new classification model.

21. The method of claim 18, further comprising:

indicating to a calibration model one or more values output from the classification model; and quantifying a concentration of the predicted substance type in the unknown substance based on values output from the calibration model.

\* \* \* \* \*

UNITED STATES PATENT AND TRADEMARK OFFICE
CERTIFICATE OF CORRECTION

| | | |
|---|---|---|
| PATENT NO. | : 10,684,388 B2 | Page 1 of 1 |
| APPLICATION NO. | : 14/360214 | |
| DATED | : June 16, 2020 | |
| INVENTOR(S) | : David L. Perkins et al. | |

It is certified that error appears in the above-identified patent and that said Letters Patent is hereby corrected as shown below:

On the Title Page

Item (54) and in the Specification, at Column 1, Line 1, -DISCRIMINATION- should read --DISCRIMINANT--

Signed and Sealed this
Twenty-ninth Day of September, 2020

Andrei Iancu
*Director of the United States Patent and Trademark Office*